United States Patent
Nunes et al.

(10) Patent No.: US 7,493,813 B2
(45) Date of Patent: Feb. 24, 2009

(54) ELECTRONIC INSTRUMENT MOVEMENT/BAROMETER

(75) Inventors: Brendon G. Nunes, c/o Trintec Industries, Inc., 467 Westney Rd. South, Unit 3, Ajax, Ontario (CA) L1S 6V7; Peter Rummell, Ajax (CA)

(73) Assignee: Brendon G. Nunes, Ajax, Ontario (CA)

(*) Notice: Subject to any disclaimer, the term of this patent is extended or adjusted under 35 U.S.C. 154(b) by 129 days.

(21) Appl. No.: 11/596,019
(22) PCT Filed: Apr. 29, 2005
(86) PCT No.: PCT/US2005/014813
§ 371 (c)(1), (2), (4) Date: Nov. 9, 2006
(87) PCT Pub. No.: WO2005/114125
PCT Pub. Date: Dec. 1, 2005

(65) Prior Publication Data
US 2008/0190196 A1   Aug. 14, 2008

Related U.S. Application Data

(60) Provisional application No. 60/570,963, filed on May 13, 2004.

(51) Int. Cl.
*G01L 7/20* (2006.01)
(52) U.S. Cl. ........................................ 73/384
(58) Field of Classification Search .................... 73/384
See application file for complete search history.

(56) References Cited

U.S. PATENT DOCUMENTS 3,618,058 A * 11/1971 Springer ................ 340/870.22
3,623,051 A    11/1971 Juno et al.
3,625,060 A * 12/1971 McCallion et al. ............ 73/384

(Continued)

FOREIGN PATENT DOCUMENTS

CN    1490685    4/2004

OTHER PUBLICATIONS

Morley, John, "A Solid-State Barometer for the HCS II", Home Automation & Building Control, Oct. 1995, pp. 63-69.

*Primary Examiner*—Andre J Allen
(74) *Attorney, Agent, or Firm*—Nixon & Vanderhye P.C.

(57) ABSTRACT

An instrument [particularly barometer ]movement includes a plurality of elements including a pressure transducer capable of sensing barometric pressure and converting the sensed pressure into electric signals, a stepper motor having an hour shaft used in a conventional quartz clock movement, a microprocessor, and a battery, operatively connected together so that the microprocessor controls movement of the stepper motor with power supplied by the battery in response changes in atmospheric pressure sensed by the pressure transducer; and a housing mounting the plurality of elements with the motor shaft extending outwardly from the housing. Other transducers, such as temperature or humidity, may alternatively be utilized. Other d.c. motors with positional feedback may sometimes alternatively be used in place of the stepper motor. The movement is operatively connected to a pointer (which may be much larger and heavier than in conventional analog instruments) which is accurately moved by the d.c. motor with respect to a dial with barometric or other indicia. An alarm, and battery voltage sensing circuitry, may be mounted within the housing and operatively connected to the microprocessor and activated by the microprocessor when the battery voltage drops below a predetermined threshold. The microprocessor preferably controls the battery so that the battery is substantially in an inactive mode more than 95% of the time. The microprocessor can also activate a second mode of the alarm if the change in the environmental condition sensed between two or more spaced transducer readings is greater than a predetermined threshold. A second dial with second pointer and motor may be utilized to indicate other environmental conditions (such as pressure rate of change, temperature, or humidity).

20 Claims, 7 Drawing Sheets

U.S. PATENT DOCUMENTS

| | | | |
|---|---|---|---|
| 3,654,808 A | | 4/1972 | Fukumoto |
| 3,713,340 A | * | 1/1973 | Springer ................. 73/384 |
| 3,815,419 A | * | 6/1974 | Springer ................. 73/384 |
| 3,815,420 A | * | 6/1974 | Springer ................. 73/384 |
| 3,940,991 A | | 3/1976 | Günttner |
| 4,543,824 A | | 10/1985 | Marterer |
| 4,597,288 A | | 7/1986 | Kyogoku et al. |
| 4,638,664 A | | 1/1987 | Tamura |
| 4,969,358 A | * | 11/1990 | Peet, II ................. 73/384 |
| 5,201,840 A | | 4/1993 | Sausner et al. |
| 5,224,059 A | * | 6/1993 | Nitta et al. ................. 73/384 |
| 5,608,374 A | | 3/1997 | Ikejiri |
| 5,652,382 A | | 7/1997 | Nakagawa et al. |
| 5,686,664 A | * | 11/1997 | Pearcy ................. 73/384 |
| 5,724,317 A | | 3/1998 | Kubota et al. |
| 5,820,262 A | | 10/1998 | Lechner |
| 6,073,480 A | | 6/2000 | Gokhfeld |
| 6,394,977 B1 | | 5/2002 | Taylor et al. |
| 6,654,894 B2 | | 11/2003 | Kaminski et al. |
| 6,754,137 B1 | * | 6/2004 | Bourquin et al. .............. 368/11 |
| 6,867,532 B2 | | 3/2005 | Brady et al. |
| 2004/0047242 A1 | | 3/2004 | Germiquet et al. |

* cited by examiner

ELECTRONIC INSTRUMENT MOVEMENT/BAROMETER

CROSS REFERENCE TO RELATED APPLICATION

This application is the U.S. national phase of International PCT Application No. PCT/US2005/014813, filed Apr. 29, 2005, which designated the United States. PCT/US2005/014813 claims the benefit of U.S. Provisional Patent Application Ser. No. 60/570,963, filed May 13, 2004. The entire contents of these applications are herein incorporated by reference.

BACKGROUND AND SUMMARY OF THE INVENTION

Aneroid barometers which use an evacuated chamber to detect changes in atmospheric pressure were developed as early as 1843. These devices are still very popular today and can be found in many homes. They also add aesthetic value because of their interesting design. Many consumers prefer the more traditional look of an analog barometer which uses a dial and a pointer to display current atmospheric conditions as opposed to the more modern digital devices which use an LCD type display [such as shown in the John Morley article "A Solid-State Barometer for the HCS II" in Home Automation & Building Control, October, 1995, pages 63-69; and the PIC based barometer instrument using a programmed PIC 16F876 Microcontroller described by Gary Sargent, Dec. 20, 2001, and available over the Internet at nutsvolts.com]. For the most part aneroid barometers work well enough for their intended purpose once properly calibrated but have several weaknesses which are hard to overcome.

First the construction of the aneroid chamber is very critical to the accuracy of the barometer and even when properly constructed over time the chamber may lose its ability to accurately respond to changes in air pressure as it was originally intended. This will cause the barometer to give incorrect readings and over time it may need to be re-calibrated. Also, in order to transmit the motion of the expansion and contraction of the aneroid chamber to the pointer a variety of mechanical linkages, levers and pivots need to be utilized. These mechanical linkages may cause further error to be introduced if they are not of the highest quality. This is why many consumers are turning their interest toward the newer, more accurate, digital barometers.

In the last few decades there have been many advances in electronic technology which have made it possible to produce very accurate digital barometers with LCD type displays. These barometers are now much more affordable due to the large volume of product being produced.

According to one aspect of the invention, a barometer is provided which combines the best of existing analog and digital barometers. The invention provides an analog dial type barometer which will retain the look and feel of a traditional barometer but have the accuracy and resolution of a modern digital barometer. This digital to analog barometer incorporates many features which makes it unique relative to anything that is currently available. While digital to analog pressure gauges are known per se [e.g. see U.S. Pat. No. 6,394,977, hereby incorporated by reference herein] they have not been used for a barometer, let alone with many of the advantageous features according to the invention.

An electronic barometer movement used in the invention is easy to use, install and calibrate. The movement will be more accurate than any aneroid movement currently available and will provide a level of resolution of plus or minus one millibar of pressure or less [e.g. about 0.5 millibar].

Using a movement according to the invention, instead of an existing conventional aneroid barometer movement, an existing manufacturer of clocks could easily be in production of an entirely new line of products within days of deciding to do so. The barometer movement of the invention can be installed into any existing clock housing as quickly as any quartz clock movement. The digital barometer movement is also far more robust and less difficult to handle than a typical aneroid movement. The only change that a manufacturer need make aside from using the barometer movement will be to change the artwork from that of a clock dial to that of a barometer dial.

An exemplary barometer according to the invention will fit into the same space as a quartz clock movement, that is approximately 2⅛ by 2⅛ by ⅝ inches [5.4 cm by 5.4 cm by 1.6 cm]. One of the primary advantages will be the ability of this movement to mount to a dial or housing using a threaded bushing and to also utilize a much larger hand or pointer than any conventional barometer. Most aneroid movements can only turn a hand that is balanced and even so there is a restriction on the weight of the hand due to the delicate mechanical nature of aneroid movement design. A typical aneroid barometer movement is usually not used to produce barometers with dial diameters of greater than eight inches [20 cm]. The average is between four and six inches [10 and 15 cm] for most barometers in use today therefore the typical pointer which an aneroid barometer may use is usually not more than three inches [7.5 cm] from center to tip. In addition if the pointer is not balanced the barometer will not function properly. This presents a problem if there is a desire to produce a barometer with a large diameter dial, for example about ten to twenty inches [25-51 cm] in diameter. There is no known prior art solution to this problem.

One of the problems associated with a large pointer is the increased weight of the pointer. A typical aneroid barometer can only tolerate a pointer that weighs a fraction of a gram. Some conventional aneroid barometer pointers weigh as little as 0.1 of a gram to about 0.25 of a gram. However, according to the electronic barometer of the invention a d.c. motor is used to drive the analog pointer, and the motor is geared so that the barometer will be capable of swinging a much larger pointer than any conventional aneroid barometer. A pointer weighing up to about 5 grams [e.g. about 3 to 5 grams], or even more, can be used; and the pointer does not have to be balanced though providing a balanced pointer will allow the use of an even larger pointer. The movement can use a pointer of up to ten inches [25 cm] from center to tip if balanced allowing the construction of a barometer which can exceed twenty four inches [61 cm] in diameter. A more typical pointer size is about six inches [15 cm] in length from center to tip and this size of pointer will not have to be balanced. By using this size pointer a manufacturer will be able to produce a barometer of sixteen inches [41 cm] in diameter, far greater than anything currently available on the market today.

One of primary features of the barometer movement according to the invention is its ability to use as a pointer any one of the thousands of readily available clock minute hands from hundreds of suppliers around the world. Current analog barometers are limited to the type of pointer they can use and are usually supplied by the barometer manufacturer. The biggest advantage of using a standard non-balanced clock hand as a pointer is that it allows the manufacturer the flexibility to select a style of pointer that suits its particular design. It is simple to match a new barometer to an existing clock that may already be part of an existing product line. The electronic barometer of the invention preferably has an output shaft which will allow any existing pointers, including conventional clock hands, to be conveniently used.

The invention also has a broader aspect than use in a pressure change indicator in general, or barometer in particular. The invention can also be used in association with temperature (alone) and/or humidity transducers. There are many known temperature transducers (which convert sensor readings into some sort of electrical signal), as well as humidity transducers. Some examples of temperature transducers are in U.S. Pat. Nos. 5,201,840, 5,820,262, and 6,654,894, and some examples of humidity transducers are in U.S. Pat. Nos. 5,608,374, 5,652,382, and 6,073,480.

Atmospheric pressure (or temperature or humidity) does not usually change very rapidly so to preserve battery life and still maintain accurate readings, the barometer/indicator of the invention will utilize a "sleep" or "idle" mode/feature. The software which controls the micro processor will put the device to "sleep". By running the microprocessor in sleep or idle mode, the device will only check the status of the pressure transducer once every minute, five minutes, or any other time interval deemed appropriate, and as desired by the parameters set in the software. The longer the sleep time interval the longer the battery will last. It is estimated that a sleep time interval of one minute will allow an exemplary 3.6 volt lithium battery to last two years or more, and a sleep interval time of five minutes will allow the battery to last for over five years [with similarly proportional times for other types of batteries]. If this feature is turned off or not used the battery will only last about five to ten days.

The instrument (e.g. barometer) movement according to the invention preferably uses a battery or batteries providing about 2.5-5 volts. A single 3.6 volt lithium battery is preferred, however two standard 1.5 volt alkaline batteries, or other conventional or to be hereafter developed, batteries can be used.

The movement preferably also has a low battery warning provision built into the software. The software will be able to be set to check the status of the battery voltage. When the voltage drops below the value set in the software the microprocessor will send an audible signal to a piezoelectric horn [or other audible, visual—such as a flashing light or LED—and/or tactile alarm] alerting the user that the battery needs to be changed. In one embodiment, for the 3.6 volt lithium battery, a voltage of 2.5 will cause the alarm to be activated.

The instrument (e.g. barometer) of the invention also has the ability to detect a significant change in environmental conditions (e.g. drop in barometric pressure) and to initiate a warning, e.g. using the piezoelectric horn, flashing light or LED, or other alarm. This alerts the user to an impending environmental condition change (e.g. bad weather). Typically the alarm type, period, or other characteristics will be varied to distinguish the low battery alarm from the bad weather alarm. For example the low battery alarm may be provided by short, intermittent, activations of the horn, while the bad weather alarm will be full scale continuous operation of the horn.

The microprocessor in the movement of the invention has the ability to store multiple pressure (and/or other environmental condition) readings over any period of time in memory. This information can be used to determine very specific rate of change of pressure data and can be used to detect adverse changes in weather. For example if the pressure drops by one millibar every five minutes for one hour the software can detect this and sound the alarm. The parameters can be set to any specified pressure drop over any duration of time and are from higher to lower pressures. The microprocessor will then send a signal to the piezoelectric horn or other alarm when that specified parameter is met. Alternatively, a second dial, pointer, and motor may be utilized to provide an analog indication of whether barometric pressure is steady, increasing, or decreasing, and by what rate.

Another desirable feature of the invention is the ability to configure the software to adjust the scale the barometer uses to display a particular pressure. The software can be adjusted to allow for wide variety of different scales. For example a standard barometer displays four inches of mercury on a 360 degree linear scale. However, it is sometimes desirable to display only two or maybe three inches [5-7.6 cm] of mercury on the same 360 degree linear scale. This gives the user much more activity of the needle/pointer and result in a high sensitivity barometer. In the case of a standard aneroid barometer it is impossible to change the scale unless the barometer is designed that way at the factory. In some parts of the world the changes in pressure are very small but they do occur, this is a particular situation when this use of a high sensitivity scale will be useful. The scale may even be adjusted [depending upon the pressure transducer utilized] so that the barometer functions as an altimeter. Of course the scale will also be adjusted if the indicator is used to display temperature or humidity in an analog manner.

The movement of the invention may have a simple push button switch [or other actuator] on the back of the housing to allow the user to set the pressure to the current conditions. The switch will interrupt the sleep mode when activated and allow the unit to be adjusted at any time.

According to one aspect of the invention there is provided a digital to analog barometer comprising: A dial with barometric indicia. A pointer operatively connected to a shaft for movement with respect to the dial. A pressure transducer positioned to sense barometric pressure and convert the pressure sensed to an electrical signal. A d.c. motor operatively connected to the pointer shaft. A microprocessor; and a battery. The pressure transducer, d.c. motor, and battery are operatively connected to the microprocessor so that the microprocessor accurately controls movement of the motor with power supplied by the battery in response to changes in pressure sensed by the pressure transducer, the motor in turn changing the position of the pointer with respect to the barometric indicia on the dial.

That is, according to one aspect of the invention there is provided a barometer comprising: a pointer operatively connected to a shaft for movement with respect to a dial; a pressure transducer; a d.c. motor [preferably a stepper motor] operatively connected to the pointer shaft; a microprocessor; and a battery; the pressure transducer, d.c. motor, and battery operatively connected to the microprocessor so that the microprocessor controls movement of the motor with power supplied by the battery in response to changes in barometric pressure sensed by the pressure transducer, characterized by: the pressure transducer is capable of sensing barometric pressure and positioned to sense barometric pressure; and a dial having barometric pressure indicia thereon positioned adjacent the pointer so that the pointer sweeps over the dial; the motor accurately changing the position of the pointer with respect to the barometric indicia on the dial under the control of the microprocessor in response to changes in barometric pressure sensed by the pressure transducer.

The d.c. motor most desirably comprises a conventional stepper motor, such as one having an hour shaft used in a conventional quartz clock movement, with the pointer shaft operatively connected to the hour shaft. However other d.c. motors which have positional feedback and can rotate the shaft either clockwise or counterclockwise (anti-clockwise) may sometimes be utilized, including servo motors with feedback circuitry, and piezoelectric motors with feedback [such as shown in U.S. Pat. No. 6,867,532]. The dial may have a diameter of at least about 10 inches [25 cm], and the pointer may have a radius of at least about 5 inches [12.5 cm], and the pointer may be balanced or unbalanced, and have a weight of at least 0.3 or 0.4 grams, e.g. at least about 2 grams.

The pressure transducer, battery, microprocessor, and stepper motor may be mounted in a housing operatively connected to the back of the dial. The dimensions of the housing may be approximately 2⅛ [5.4 cm] by 2⅛ [5.4 cm] by ⅝ [1.6 cm] inches, with the pointer shaft extending outwardly from the housing. A temperature sensor is preferably also mounted in the housing, and operatively connected to the microprocessor so that pressure determinations from the pressure transducer are temperature compensated. Still further, the housing may contain a battery voltage sensing circuit, and an alarm operatively connected to the microprocessor and activated by the microprocessor when the battery voltage as sensed by the battery voltage sensing circuit drops to or below a predetermined threshold. The alarm may also be activated, in a different mode than when the battery voltage drops, or a second alarm may be activated, if the pressure change between two or more substantially consecutive pressure readings [e.g. spaced more than about one minute apart] is greater than a predetermined threshold. Preferably the microprocessor controls the battery so that the battery is substantially in an inactive mode more than 90% (e.g. more than 95%) of the time. The battery may comprise a single about 3.6 volt lithium battery, or two or more about 1.5 volt alkaline batteries The barometer may further comprise a second dial, and a second pointer having a second shaft operatively connected to a second d.c. motor with positional feedback, and the second motor connected to the battery, so that the microprocessor records pressure transducer readings over an extended period of time and controls the second d.c. motor to position the second pointer with respect to the second shaft to indicate atmospheric pressure trends.

According to another aspect of the present invention there is provided an indicator comprising: A dial with indicia thereon. A pointer operatively connected to a shaft for movement with respect to the dial. A pressure, temperature, or humidity transducer positioned to sense pressure, temperature, or humidity. A d.c. motor with positional feedback operatively connected to the pointer shaft. A microprocessor; and a battery. The transducer, d.c. motor, and battery are operatively connected to the microprocessor so that the microprocessor controls movement of the motor with power supplied by the battery in response changes in pressure, temperature, or humidity sensed by the transducer, the motor in turn accurately changing the position of the pointer with respect to the indicia on the dial; and the transducer, battery, microprocessor, and d.c. motor are mounted in a housing operatively connected to the back of the dial, the housing having dimensions of approximately 2⅛ [5.4 cm] by 2⅛ [5.4 cm] by ⅝ [1.6 cm] inches, with the pointer shaft extending outwardly from the housing past the dial. The dial and pointer may have the dimensions and weights as set forth above. The indicator may further comprise an alarm, and battery voltage sensing circuitry, mounted within the housing and operatively connected to the microprocessor and activated by the microprocessor when the battery voltage, as sensed by the circuitry, drops to or below a predetermined threshold; and the microprocessor may control the battery so that the battery is substantially in an inactive mode more than 90% of the time. Where a pressure transducer is used, temperature compensation for the pressure transducer may also be provided, as described above.

According to another aspect of the invention there is provided a barometer, temperature, or humidity movement per se comprising: A plurality of elements including a pressure, temperature, or humidity transducer capable of sensing barometric pressure, temperature, or humidity and converting the sensed condition into electric signals; a stepper motor having an hour or minute shaft used in a conventional quartz clock movement; a microprocessor; and a battery, the elements operatively connected together so that the microprocessor controls movement of the stepper motor with power supplied by the battery in response changes in an environmental condition (e.g. barometric pressure) sensed by the transducer. And a housing mounting the plurality of elements with the motor shaft extending outwardly from the housing.

That is, according to this aspect there is provided an instrument movement comprising: a transducer capable of sensing barometric pressure, temperature, or humidity, a microprocessor, and a battery mounted in a housing, characterized by a stepper motor having an hour or minute shaft used in a conventional quartz clock movement with the motor shaft extending outwardly from the housing; the battery, stepper motor, transducer, and microprocessor being operatively connected together so that the microprocessor controls movement of the stepper motor with power supplied by the battery in response changes in atmospheric pressure, temperature, or humidity sensed by the transducer.

The movement may further comprise an alarm, and battery voltage sensing circuitry, mounted within the housing and operatively connected to the microprocessor and activated by the microprocessor when the battery voltage, as sensed by the circuitry, drops to or below a predetermined threshold. Preferably, the microprocessor functions so that the alarm is also activated, in a different mode than when the battery voltage drops, or a second alarm is activated, if the condition sensed [e.g. barometric pressure] change between two or more spaced readings [e.g. spaced more than about one minute apart] is greater than a predetermined threshold. Where a pressure transducer is provided, the housing also preferably includes a temperature sensor mounted within the housing and operatively connected to the microprocessor so that pressure determinations from the pressure transducer are temperature compensated. Preferably the microprocessor controls the battery so that the battery is substantially in an inactive mode more than 90% (e.g. more than 95%) of the time.

It is the primary object of the invention to provide a digital to analog indicator and movement that are versatile, relatively inexpensive, accurate, and simple to construct, and are particularly useful for displaying barometric pressure, but also useful for displaying other pressure values, temperature, and/or humidity. This and other object of the invention will become clear from the detailed description of the invention, and from the appended claims.

BRIEF DESCRIPTION OF THE DRAWINGS

In the exemplary embodiment of the invention illustrated in the drawings.

DETAILED DESCRIPTION OF THE DRAWINGS

Figure 1:
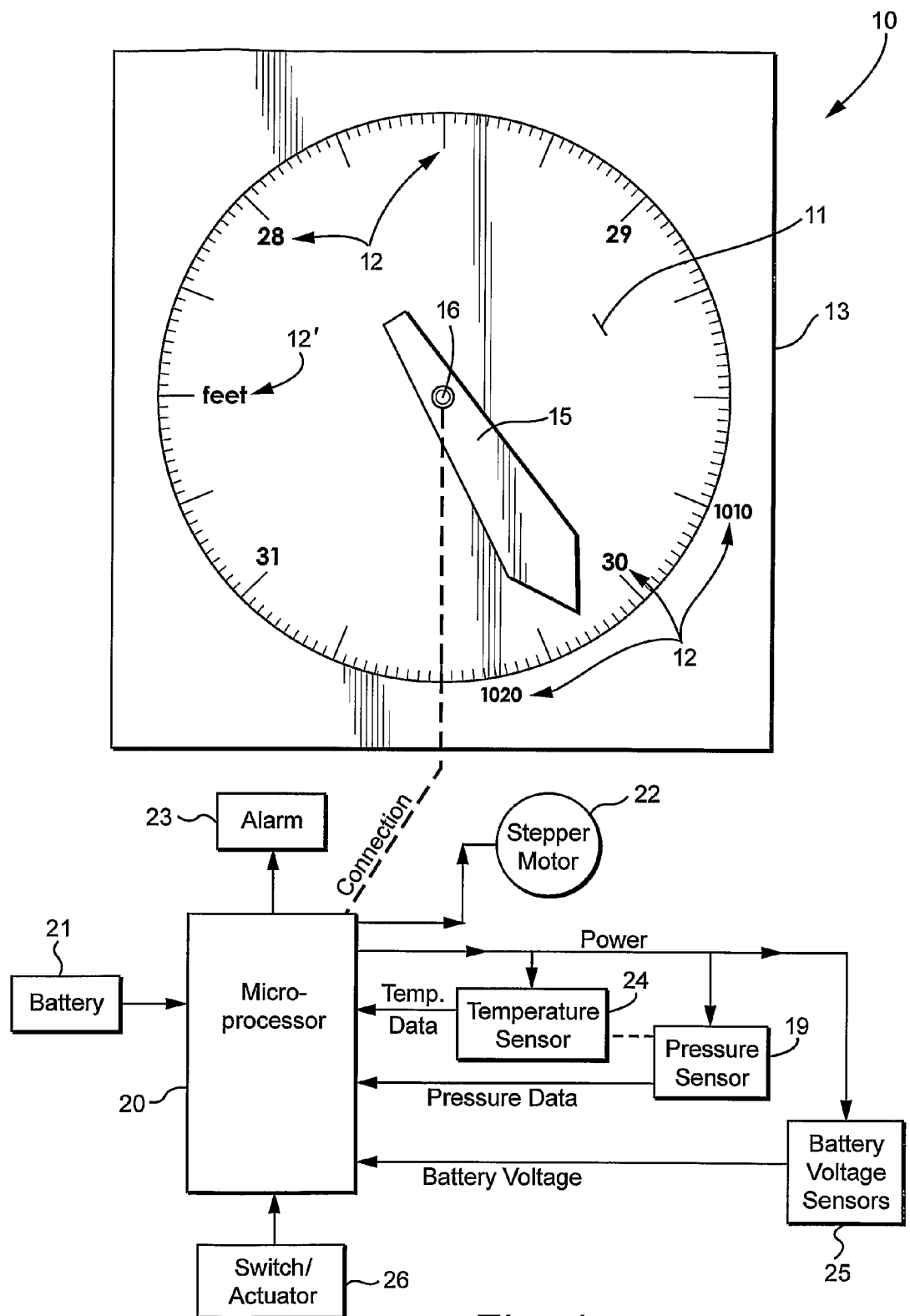
FIG. 1 is a front schematic view of an exemplary barometer according to the invention, with the operating components shown by box diagrams.

An exemplary barometer according to the present invention is illustrated primarily schematically in FIG. 1, generally by reference numeral 10. The barometer 10 includes a dial 11 with conventional indicia 12 therein (e.g. illustrating atmospheric pressure, such as in inches of mercury and/or millibars). Additional indicia indicating altitude may also be provided, such as the indicia 12' schematically shown in FIG. 1. The dial 11 is mounted in a housing 13, of metal, plastic, wood, or any other suitable material. The dial 11 may have a diameter of from just a few inches [or centimeters] up to about 24 inches [61 cm].

Figure 2:
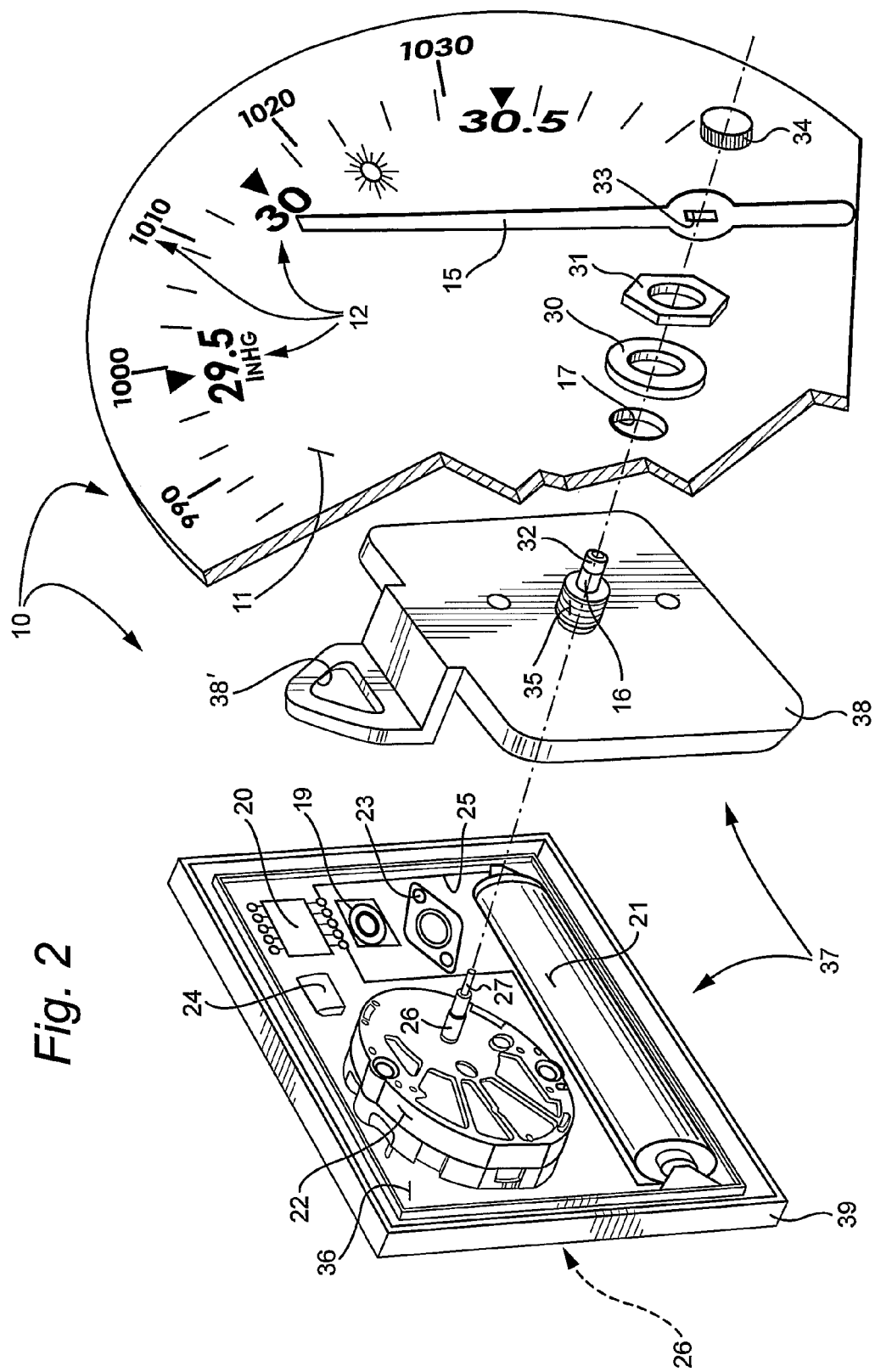
FIG. 2 is an exploded isometric view of the barometer dial, casing which holds the operating components, pointer, and the operating components themselves of the barometer of FIG. 1.

Moving over the dial 11 in response to atmospheric pressure is a pointer 15 which is mounted on and rotated by a shaft or spindle 16 which passes through an opening 17 [see FIG. 2] in dial 11. While the pointer 15 may be a conventional balanced barometer pointer such as used in aneroid barometers, according to the invention there are a wide variety of other configurations the pointer 15 could take. For example, as illustrated in FIG. 1 the pointer 15 may resemble a conventional clock hour or minute pointer, and it need not be balanced. The largest radius of the pointer 15 (from shaft 16) may be more than about 5 inches [12.5 cm], for example between about 5-10 inches [12.5-25 cm], and it may weigh considerably more than 0.25 gram (the present practical maximum for analog barometer pointers), for example at least 0.3 gram or 0.4 grams, preferably about 2 grams or more (e.g. about 3-5 grams). Balanced pointers may be heavier and larger than unbalanced pointers (like pointer 15 in FIG. 1).

The major operating components of the barometer 10, as illustrated schematically in FIG. 1 and pictorially in FIG. 2, are a pressure transducer 19, microprocessor [with software] 20, battery 21, stepper motor 22, alarm 23, temperature sensor 24, battery voltage sensing circuitry 25, and a manual actuator/switch 26.

The pressure transducer 19 may be of any conventional or hereafter developed type, analog or digital, such as shown in U.S. Pat. No. 6,394,977, or the Morley article or the Sargent disclosure both mentioned above, and preferably is one capable of sensing atmospheric pressure. It may be simple, or complex. Some commercially available pressure transducers include inherent temperature compensation and their own microprocessor, in which case the separate components 20, 24 may be redundant. The invention may utilize pressure transducers 19 of any complexity or range. The pressure transducer 19 is preferably positioned so as to sense barometric pressure at any particular ambient location.

The microprocessor 20 may also be of any suitable conventional or hereafter developed type capable of performing the operations described herein. Exemplary software for controlling the microprocessor 20 will be described with respect to FIGS. 3-6.

The battery or batteries 21 preferably provides/provide about 2.5-5 volts. A single 3.6 volt lithium battery is preferred, however two standard 1.5 volt alkaline batteries, or other conventional or to be hereafter developed, batteries can be used. The battery/batteries 21 provide power for powering all operating components of the barometer 10, but in extreme cases a transformer and a.c. or d.c. source of current may be utilized.

The stepper motor 22 must be capable of driving a relatively large and heavy pointer 15 with precision. While any suitable conventional or to-be hereafter developed stepper motor 22 may be utilized, particularly practical stepper motors 22 are miniature stepper motors available from Switec with model numbers 16-101, -103, -123, and -504. These motors are conventionally used in quartz clock movements, and have an hour pointer output shaft 26 and minute pointer output shaft 27. As seen in FIG. 2, the shaft 16 for driving the pointer 15 is preferably operatively connected (that is, in any manner that allows the components to function properly) to the motor shaft 26 [although in some circumstances it could be connected to 27 instead]. The gear ratio provided through the hour shaft 26 has many desirable qualities for barometer use, especially if the barometer 10 will be subjected to movement (as on a boat). Other motors having gearing ratios ± about 30% of the gearing ratios of these Switec motors are particularly suitable for use as the stepper motor 22.

While a stepper motor 22 is preferred, instead any d.c. motor with positional feedback (e.g. a feedback circuit) may be utilized, including, but not limited to, servo motors, or piezoelectric motors [e.g. as in U.S. Pat. No. 6,867,532, FIG. 9].

FIG. 2 also shows how the shaft 16 can be connected to the pointer 15. The shaft 16 passes through opening 17 in dial 11, and through washer 30 and nut 31. The nut 31 screws onto the exterior screw thread of bushing 35, through which the shaft 16 also extends. The tapered tip 32 of shaft 16 passes through opening 33 in pointer 15, and is received and held in place by cap 34. All of the components 16 and 30-35 are conventional per se, such as for quartz clocks.

The alarm 23 can be any suitable electrically powered alarm. One example, and what is schematically illustrated in FIG. 2, is a piezoelectric horn. However, any visual [including blinking lights or LEDs] and/or audible and/or tactile alarm can be utilized. Typically, the alarm 23 is capable of being operated in at least two different modes, e.g. intermittently or continuously, or at a high decibel level and a lower decibel level, etc., or more than one alarm 23 is provided (an alarm for each warning condition).

The temperature sensor 24, if utilized, may be any conventional or to be hereafter developed temperature sensor. Provision can be made for readout of the temperature sensed by sensor 24 on the dial 11 or housing 13, but preferably the sensor 24 only provides compensation for the pressure transducer 19 to insure that it is substantially accurate. The temperature compensation may be provided by the software of the microprocessor 20 using standard algorithms.

The battery voltage sensing circuitry 25 is conventional.

All of the components 19-25 are operatively connected together by any suitable standard electrical and physical connections. Desirably, the components 19-25 are mounted on a common support, such as the board 36 [FIG. 2], and the board 36 is mounted in a housing 37. In the exemplary embodiment schematically shown in FIG. 2, the housing 37 is of molded plastic and comprises a front portion 38 and a rear portion 39. The front portion 38 receives the shaft 16 and has an eye construction 38' which allows one to hang the barometer 10 on a nail or like hardware on a wall or other surface. The board 36, with components 19-25 thereon, is sandwiched between the portions 38, 39, and the portions 38, 39 are releasably or substantially permanently fastened together. The housing 37 preferably has substantially the same shape and approximate dimensions as a standard quartz clock movement casing, e.g. approximately 2⅛ by 2⅛ by ⅝ inches [approximately 5.4 cm by 5.4 cm by 1.6 cm]. Also, the housing 37 is operatively connected to the back of the dial 11 (e.g. through the housing 13), and preferably interacts with the shaft 16, dial 11, and housing 13, in substantially the same way as for a conventional wall or desk clock with a quartz movement.

A pushbutton or like actuator—shown only schematically at 26 in FIGS. 1 & 2—may be provided to manually move the pointer 15 to a reset or other desired position. Any conventional operative connection between the actuator 26 and pointer 15 may be utilized (such as through the stepper motor 22).

While in a preferred embodiment according to the invention, the movement and instrument are a barometer movement and barometer (or other fluidic pressure device), the invention also has applicability to other types of instruments and movements, and has the same advantages of low cost, versatility (including large size instruments and pointers), and ease of construction that the barometer movement and barometer enjoy. For example, the invention as illustrated in FIGS. 1 and 2 may also comprise a thermometer, in which case the pressure transducer 19 is eliminated while the temperature transducer senses ambient temperature. In this case the dial 11 markings 12 are changed to temperature markings, and of course the software for the microprocessor 20 is adjusted to allow accurate display of temperature data instead of barometric pressure. Similarly, a humidity transducer may be substituted for the pressure transducer 19, and the indicia 12 changed to indicate humidity, with commensurate changes to the software for the microprocessor 20.

FIGS. 3-6 provide a generally self-explanatory high level flow sheet which indicates exemplary software utilized in the microprocessor 20 for achieving desirable results according to the invention, for the barometric pressure embodiment. After initialization procedures indicated by boxes 40 in FIG. 3, there is a short time delay as indicated by box 41, and then at 42, 43, the raw temperature (from 24) and pressure (from 19) data are read. At 44 the power from battery 21 is turned off to the transducer 19, sensor 24, and battery sensing circuitry 25, and to other components, as indicated by box 45. Then at 46 the temperature (to compensate the pressure transducer 19 reading) and pressure are calculated from the data from 42, 43 (using standard algorithms), and the position of pointer 15 is calculated at 47.

Figure 3:
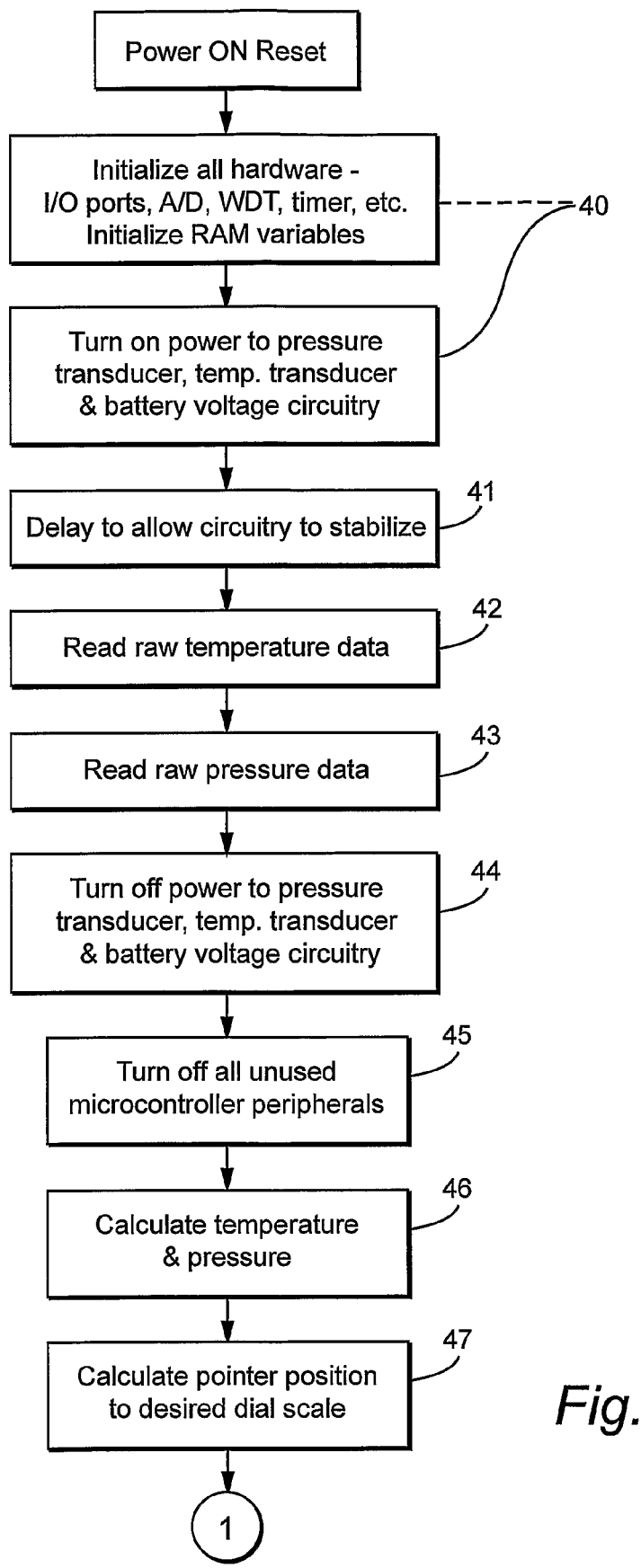
FIGS. 3-6 comprise a high level flow sheet illustrating exemplary operation of the software to control the microprocessor and barometer according to one embodiment of the invention.
Figure 4:
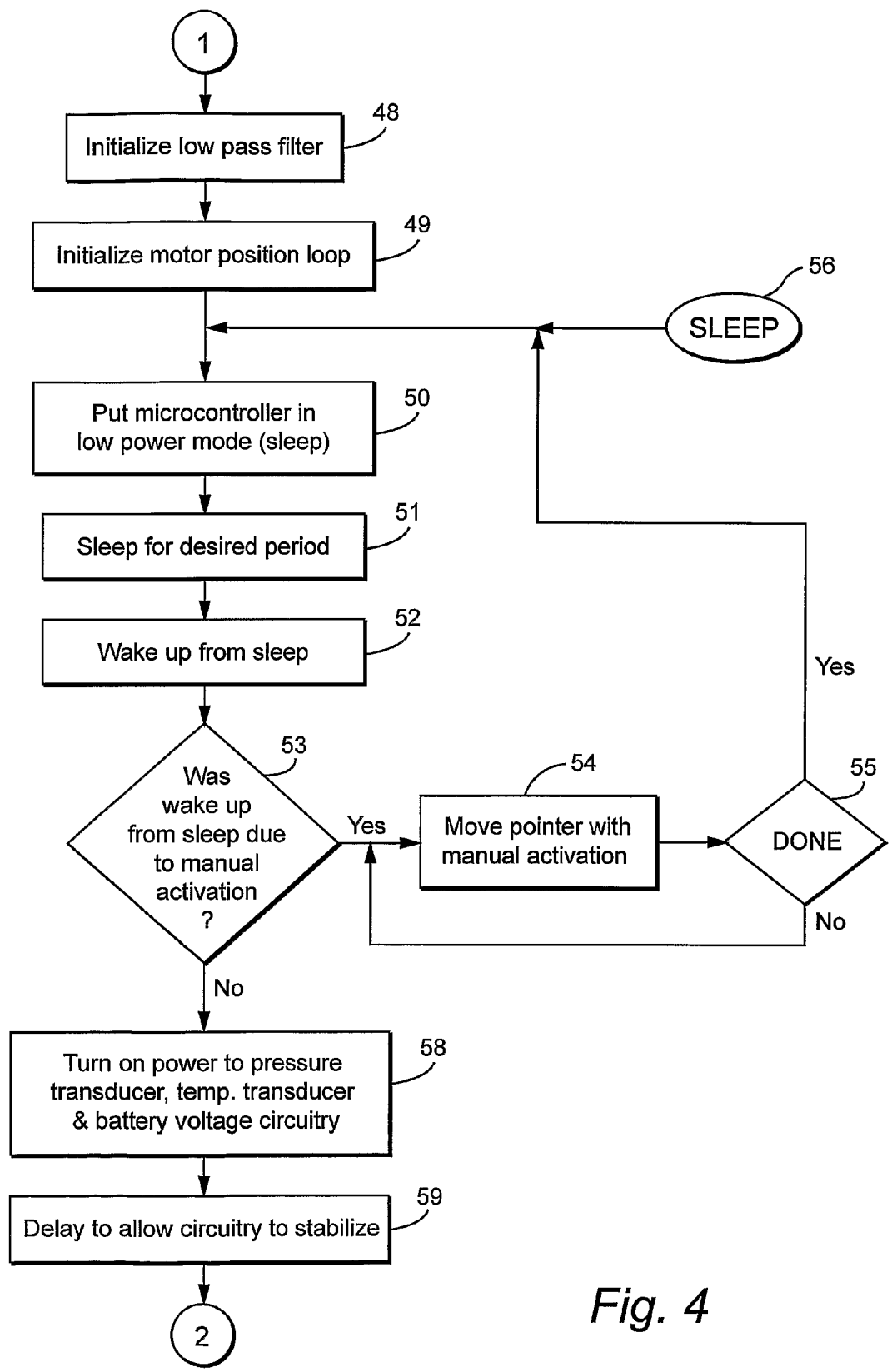

Continuing on FIG. 4 from ①1 on FIG. 3, a low pass filter is initialized at 48, and the stepper motor 22 position loop is initialized at 49. Most of the time the motor 22 (and battery 21) will be in a sleep or inactive mode, as indicated at 50. However at appropriate time intervals—indicated schematically at 51—the units will wake up, as indicated at 52 in FIG. 4. The time intervals 51 may be regular, such as every one minute or every five minutes, or may vary depending upon circumstances. For example if when the unit awakens it senses (as hereafter described) a significant change in pressure, then the time interval 51 for the next awakening may be shortened, e.g. from 3 minutes to 30-90 seconds. Preferably, however, the microprocessor 20 controls the battery 21 (and other components) so that the battery 21 is substantially in an inactive mode more than 90% of the time (e.g. about 95-99.5% of the time).

As indicated by decision box 53, a decision will be made to wake up from the sleep mode and operate automatically, or if a manual movement of pointer 15 has been initiated by depressing actuator 26. If there is a manual movement as indicated at 54, then after the movement is accomplished (e.g. by incrementally moving the motor 22 one increment for each depression of actuator 26) as indicated at 55, then the system will return to the sleep mode as indicated at 56. If automatic wake-up is to be initiated, then the power from battery 21 to the components is turned on as indicated at 58, with a delay built in at 59 to allow the circuitry to stabilize.

Figure 5:
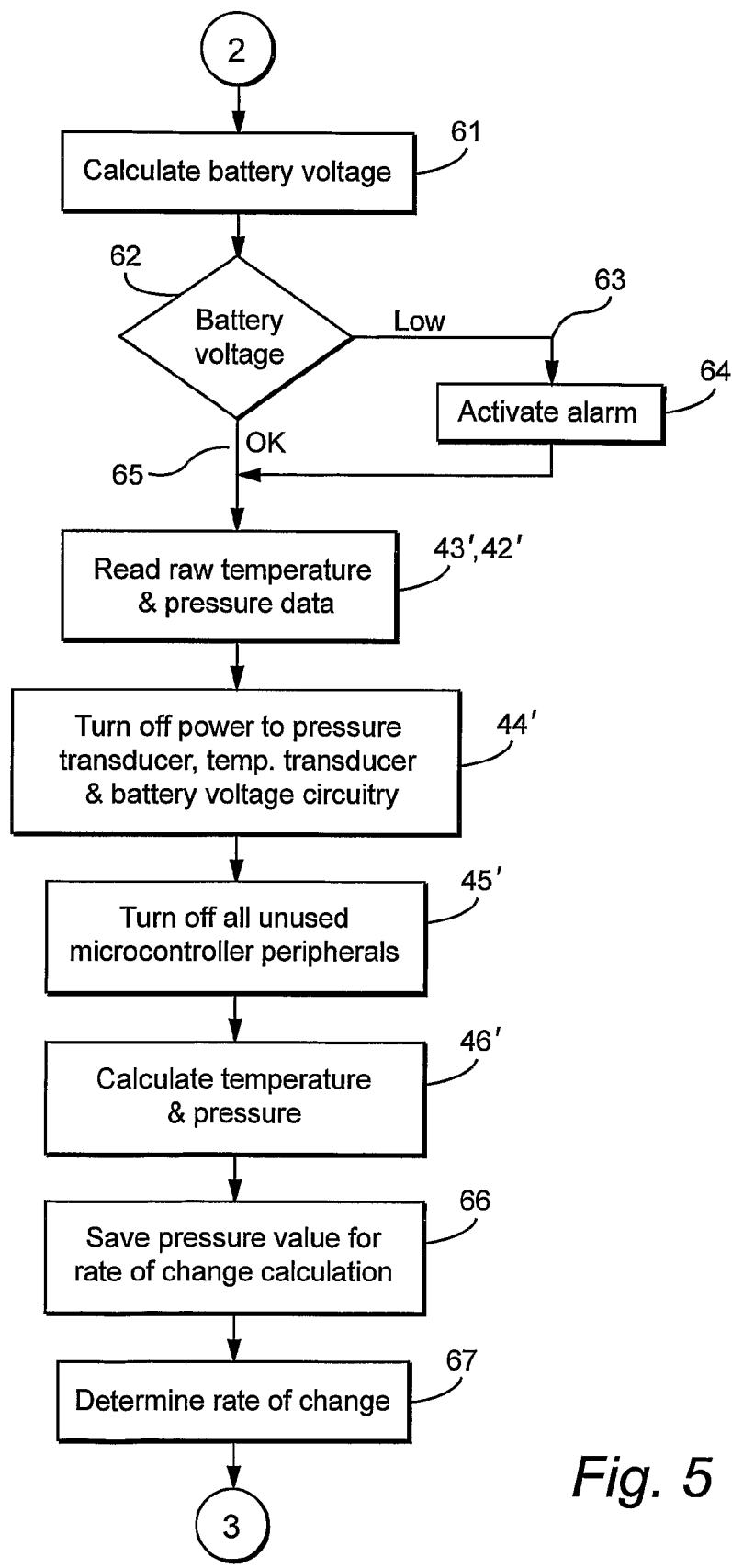

Continuing on FIG. 5 from ②on FIG. 4, the voltage of battery 21 is calculated by microprocessor 20 as indicated at 61. At decision block 62 the battery voltage is evaluated. If, for example, it is 2.5 volts or lower (for a 3.6 volt lithium battery 21), then the "low battery" path 63 is followed, and the alarm 24 is operated (e.g. a short but loud sound is emitted therefrom), as indicated at 64. If the battery voltage is acceptable, then path 65 is followed, and the steps indicated by boxes 42'-46' (comparable to 42-46 in FIGS. 3 & 4) are practiced.

The pressure value calculated form 46' is saved at 66 for use in 67 to determine a rate of change by performing a rate of change calculation. Continuing on FIG. 6 from ③ on FIG. 5, at decision block 68 a determination is made about whether the rate of change determined in 67 indicates bad weather (e.g. is more than a predetermined threshold amount). If "Yes", then alarm 23 is activated as indicated at 69. For example, if the change in pressure [Δ] from the last reading (or between any two or more substantially consecutive readings, for example between three consecutive readings) is greater than a predetermined amount [e.g. >0.3 in. [0.75 cm] Hg] then the alarm 23 is activated in a different mode/manner than at 64; for example, at 69 the alarm 23 is turned on to operate continuously for at least about 30-90 seconds.

If there is a "No" decision at 68, then at 47' (corresponding to 47) the pointer 15 position is calculated to the desired dial 11 scale 12. The low pass filter is applied at 71, and then at decision block 72 a determination is made about a change in the pointer 15 position. If "Yes", as indicated by path 73, then at block 74 the pointer 15 is moved with the motor 22. After completion of proper pointer 15 movement with respect to indicia 12 to accurately record the pressure change, or if the decision from 72 is "No" (proceeding in path 75), then as indicated at 76, the routine returns to the sleep mode, to position 56 in FIG. 4.

The microprocessor 20 also can be controlled to easily and automatically change the amount of movement of the pointer 15 depending upon the pressure readings from transducer 19 to accommodate different dials 11, or different sets of indica 12, 12' on the dial 11. For example, if altitude [directly related to ambient pressure] is to be read rather than barometric pressure at a given point on earth, then the microprocessor 20 activates motor 22 (supplying power from battery 21) in a different manner. Another type of pressure transducer 19 may be substituted in such a circumstance also.

Figure 6:
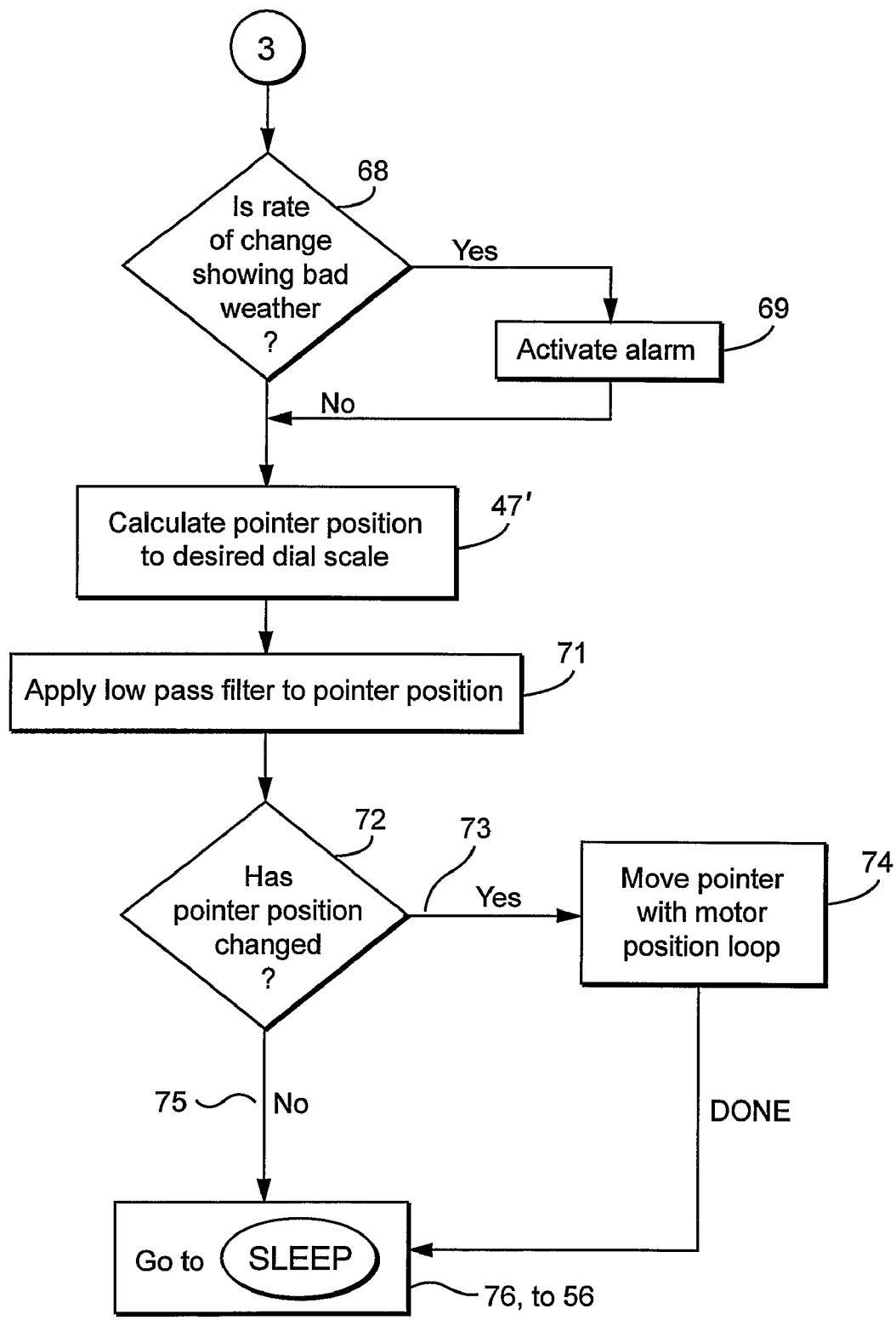
Figure 7:
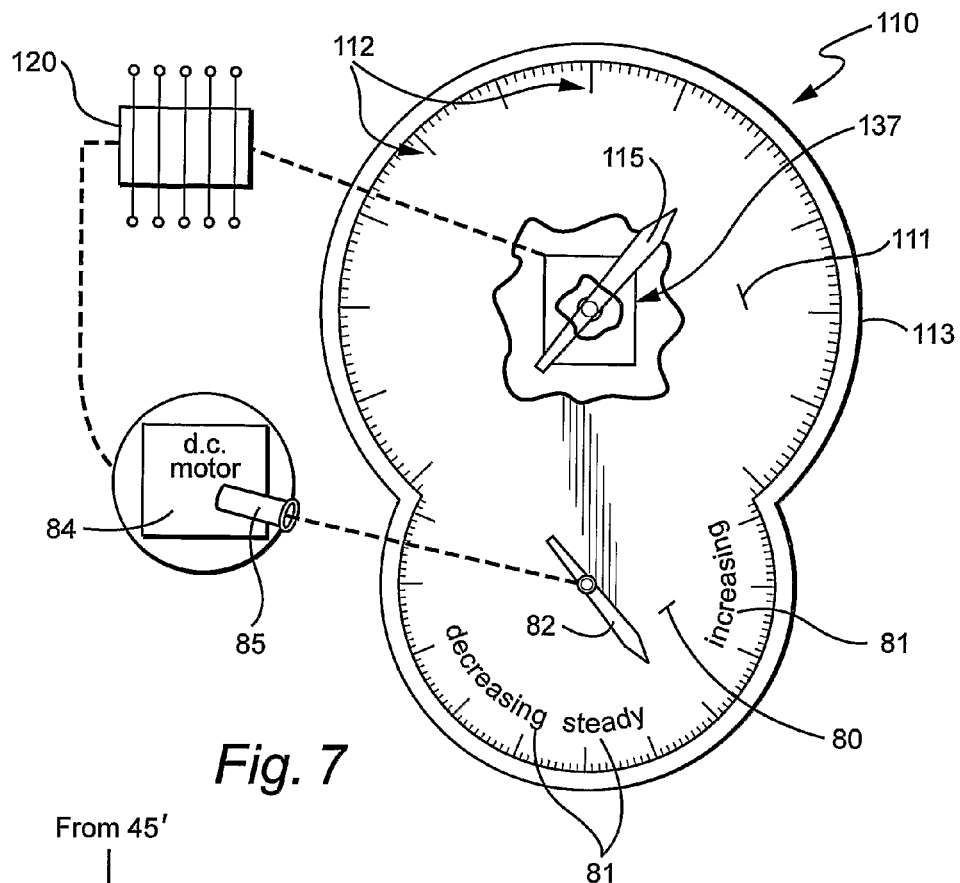
FIG. 7 is a schematic top view, with portions cut away and other portions schematically exploded, to illustrate relevant components, of an embodiment of the invention which uses two dials, such as one for pressure and the other for pressure change.
Figure 8:
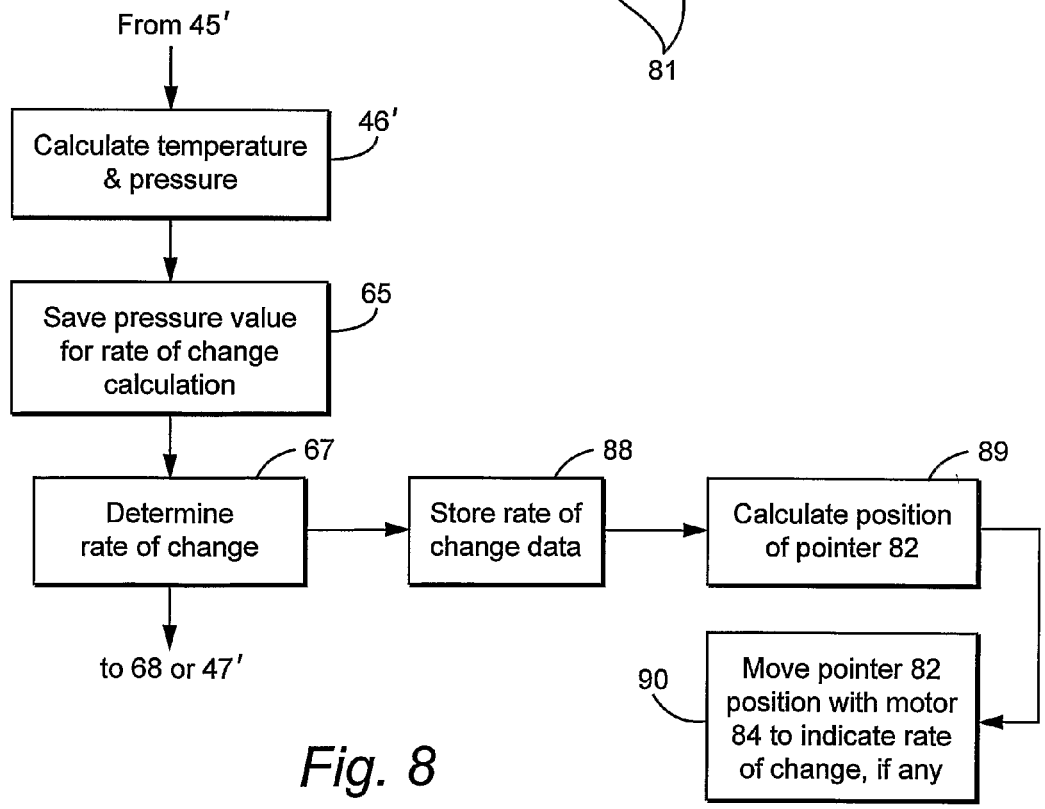
FIG. 8 is a high level flow sheet indicating exemplary additions to the flow sheet of FIGS. 3-6 to accommodate the two dial embodiment of FIG. 7.

The embodiment of FIGS. 7 & 8 is similar to that of FIGS. 1-6 except that it includes additional readout. In FIG. 7 components similar or identical to those in FIGS. 1 & 2 are shown by the same reference numeral only preceded by a "1", and in FIG. 8 boxes similar to those in FIG. 5 are shown by the same reference numerals.

The barometer 110 includes the main barometric indicia 112 dial 111, and a second dial 80 with pressure rate of change indicia 81 thereon, mounted in the same casing 113. The housing 137 containing the pressure transducer, d.c. motor, etc., includes the microprocessor 120, shown exploded in FIG. 7, which controls the position of first pointer 115, as described above with respect to pointer 15 and microprocessor 20. The barometer 110 also includes a second pointer 82 which moves over second dial 80 and is controlled by a second d.c. motor 84 (such as a stepper motor like motor 22, or the other d.c. motors with feedback described with respect to FIGS. 1 & 2). The shaft 85 of second motor 84 is operatively connected to the second pointer 82, and controls the position of the pointer 82 with respect to the pressure rate of change indicia 81 on dial 80. The second motor 84 is also controlled by microprocessor 120, being operatively connected thereto, such as by conventional electrical leads (not shown), or wirelessly using conventional techniques.

FIG. 8 schematically illustrates an exemplary control of the second motor 84. The barometric pressure rate of change data from 67 (in FIG. 5) is stored at 88 in FIG. 8, and this information is ultimately used by microprocessor 120 to operate second motor 84 to move second pointer 82. For example, as indicated at 89 the position of pointer 82 is calculated, and as indicated at 90 the pointer 82 is moved using motor 84 to indicate pressure rate of change (e.g. increasing or decreasing, and how quickly), if any. The second dial 80, pointer 82, and motor 84 may be used in addition to, or in place of, the pressure rate of change mode of the alarm 23 with associated control boxes 68, 69 (FIG. 6).

As another alternative, the second dial 80, indicia 81, and pointer 82 may be associated with some other condition besides pressure change. For example, a temperature sensor like the sensor 24 in FIG. 1, in housing 137, could—through the microprocessor 120—send signals to second motor 84 to move the second pointer 82 to indicate temperature. Alternatively a humidity transducer could be used (preferably in housing 137), with the second dial 80, indicia 81, and pointer 82 indicating humidity.

It is to be understood that all numerical ranges given in this disclosure are approximate, and that all narrower ranges within a broad range are specifically disclosed. For example, a range of ±30% specifically includes −5- +10%, +6-24%, +2-7%, and all other narrow ranges within the broad range. Also, while the invention has been herein shown and described in what is presently considered to be the most practical and preferred embodiment thereof, it is to be understood that the invention is to be accorded the broadest interpretation possible consistent with the prior art to cover all equivalents.

What is claimed is:

1. An instrument movement comprising:
   a plurality of elements including a transducer capable of sensing barometric pressure, temperature, or humidity and converting the sensed condition into electric signals, a stepper motor having an hour or minute shaft used in a conventional quartz clock movement, a microprocessor, and a battery, operatively connected together so that the microprocessor controls movement of the stepper motor with power supplied by the battery in response changes in atmospheric pressure, temperature, or humidity sensed by the transducer; and
   a housing mounting said plurality of elements with the motor shaft extending outwardly from the housing.

2. A movement as recited in claim 1 further comprising an alarm, and battery voltage sensing circuitry, mounted within the housing and operatively connected to the microprocessor and activated by the microprocessor when the battery voltage, as sensed by the circuitry, drops to or below a predetermined threshold; and wherein the microprocessor controls the battery so that the battery is substantially in an inactive mode more than 95% of the time.

3. A movement as recited in claim 2 wherein microprocessor functions so that the alarm is also activated, in a different mode than when the battery voltage drops, or a second alarm is activated, if the change in condition sensed between two or more spaced transducer readings is greater than a predetermined threshold.

4. A movement as recited in claim 1 wherein the transducer is a barometric pressure transducer; and further comprising a temperature sensor mounted within the housing and operatively connected to the microprocessor so that pressure determinations from the pressure transducer are temperature compensated.

5. A digital to analog barometer comprising:
   a dial with barometric indicia;
   a pointer operatively connected to a shaft for movement with respect to the dial;
   a pressure transducer positioned to sense barometric pressure and convert the pressure sensed to an electrical signal;
   a d.c. motor operatively connected to the pointer shaft;
   a microprocessor; and
   a battery;
   the pressure transducer, d.c. motor, and battery operatively connected to the microprocessor so that the microprocessor accurately controls movement of the motor with power supplied by the battery in response to changes in barometric pressure sensed by the pressure transducer, the motor in turn changing the position of the pointer with respect to the barometric indicia on the dial.

6. A barometer as recited in claim 5 wherein the d.c. motor comprises a conventional stepper motor having a minute or hour shaft used in a conventional quartz clock movement; and wherein the pointer shaft is operatively connected to the minute or hour shaft.

7. A barometer as recited in claim 5 wherein the dial has a diameter of at least about 10 inches [25 cm], and the pointer has a radius of at least about 5 inches [12.5 cm].

8. A barometer as recited in claim 5 wherein the pointer has a weight of at least about 2 grams.

9. A barometer as recited in claim 6 wherein the motor is operatively connected to the hour shaft; and wherein the pressure transducer, battery, microprocessor, and stepper motor are mounted in a housing operatively connected to the back of the dial, and wherein the housing has dimensions of approximately 2⅛ by 2⅛ by ⅝ inches [5.4×5.4×1.6 cm], with the pointer shaft extending outwardly from the housing.

10. A barometer as recited in claim 5 further comprising a temperature sensor operatively connected to the microprocessor so that pressure determinations from the pressure transducer are temperature compensated.

11. A barometer as recited in claim 5 further comprising a battery voltage sensing circuit, and an alarm operatively connected to the microprocessor and activated by the microprocessor when the battery voltage as sensed by the battery voltage sensing circuit drops to or below a predetermined threshold.

12. A barometer as recited in claim 11 wherein the alarm is also activated, in a different mode than when the battery voltage drops, or a second alarm is activated, if the pressure change between two or more substantially consecutive pressure readings is greater than a predetermined threshold.

13. A barometer as recited in claim 5 wherein the microprocessor controls the battery so that the battery is substantially in an inactive mode more than 95% of the time.

14. A barometer as recited in claim 5 wherein the d.c. motor comprises a motor with feedback so that the microprocessor has the ability to accurately control shaft placement by rotating the shaft in either clockwise or counterclockwise direction.

15. A barometer as recited in claim 5 wherein the d.c. motor comprises a stepper motor.

16. A barometer as recited in claim 5 further comprising a second dial, and a second pointer having a second shaft operatively connected to a second d.c. motor with positional feedback, and the second motor connected to the battery; and wherein the microprocessor records pressure transducer readings over an extended period of time and controls the second d.c. motor to position the second pointer with respect to the second shaft to indicate atmospheric pressure trends.

17. A barometer as recited in claim 5 wherein the battery comprises a single about 3.6 volt lithium battery, or two or more about 1.5 volt alkaline batteries.

18. An environmental condition indicator comprising:
a dial with fluid pressure, temperature, or humidity related indicia;, a pointer operatively connected to a shaft for movement with respect to the dial;
a pressure, temperature, or humidity transducer positioned to sense fluidic pressure, temperature, or humidity, respectively;
a d.c. motor with positional feedback operatively connected to the pointer shaft;
a microprocessor; and
a battery;
the transducer, d.c. motor, and battery operatively connected to the microprocessor so that the microprocessor controls movement of the motor with power supplied by the battery in response changes in an environmental condition sensed by the transducer, the motor in turn accurately changing the position of the pointer with respect to the indicia on the dial; and
the transducer, battery, microprocessor, and d.c. motor mounted in a housing operatively connected to the back of the dial, the housing having dimensions of approximately 2⅛ by 2⅛ by ⅝ inches [5.4×5.4×1.6 cm], with the pointer shaft extending outwardly from the housing past the dial.

19. An indicator as recited in claim 18 wherein the dial has a diameter of at least about 10 inches [25 cm], and the pointer has a radius of at least about 5 inches [12.5 cm] and a weight of at least about 0.4 grams.

20. An indicator as recited in claim 18 further comprising an alarm, and battery voltage sensing circuitry, mounted within the housing and operatively connected to the microprocessor and activated by the microprocessor when the battery voltage, as sensed by the circuitry, drops to or below a predetermined threshold; and wherein the microprocessor controls the battery so that the battery is substantially in an inactive mode more than 90% of the time.

* * * * *